United States Patent [19]
Andrews

[11] Patent Number: 5,315,064
[45] Date of Patent: May 24, 1994

[54] SUSPENDED LINE BREAKAWAY DEVICE

[75] Inventor: Dean D. Andrews, Topeka, Kans.

[73] Assignee: William D. Piper, Memphis, Tenn.

[21] Appl. No.: 789,581

[22] Filed: Nov. 8, 1991

[51] Int. Cl.$^5$ .................. H02G 7/04; H01R 13/62
[52] U.S. Cl. .................... 174/40 TD; 174/40 R; 174/44; 174/45 TD; 403/DIG. 3; 403/375; 439/258; 439/353
[58] Field of Search .............. 174/40 TD, 40 R, 44, 174/45 R, 45 TD; 439/155, 160, 258, 474, 923, 348, 350, 352, 353, 354; 403/319, 323, 361, 375, DIG. 3

[56] References Cited

U.S. PATENT DOCUMENTS

| | | | |
|---|---|---|---|
| 1,605,904 | 11/1926 | Van Brunt | 439/474 |
| 3,117,181 | 1/1964 | Wilson | 174/40 R X |
| 3,336,562 | 8/1967 | McCormick et al. | 439/258 X |
| 3,519,727 | 7/1970 | Rasmussen et al. | 174/45 R |
| 3,711,049 | 1/1973 | Grannis | 174/40 R X |
| 3,761,865 | 9/1973 | Bomgaars et al. | 174/40 R X |
| 3,953,098 | 4/1976 | Avery et al. | 439/258 |
| 4,176,899 | 12/1979 | Betts | 439/155 |
| 4,195,192 | 3/1980 | Hackney et al. | 174/40 R |
| 4,362,348 | 12/1982 | Stephenson et al. | 439/258 |
| 4,605,271 | 8/1986 | Burns | 439/160 |
| 4,645,282 | 2/1987 | Frear | 439/160 |
| 4,703,382 | 3/1892 | Kerstein | 174/40 TD X |

Primary Examiner—Leo P. Picard
Assistant Examiner—Hyung S. Sough
Attorney, Agent, or Firm—Kokjer, Kircher, Bowman & Johnson

[57] ABSTRACT

An improved suspended line cable breakaway device includes a first body portion for connecting to a first end of a support cable and a second body portion for connecting to a second end of the support cable. The first body portion includes resilient fingers having nubs, which are releasably received by slots contained in a cavity wall of the second body portion. A biased spreader, slidably contained in a cavity in the second body portion, is displacable axially along the cavity by an external force along the support cable to urge the nubs outwardly such that the second body portion is disengaged from the first body portion, simultaneously disconnecting component lines of a first end of a suspended line from corresponding component lines of a second end of the suspended line. A shield protects the component line connections, which are spaced internal to the device, from the elements. One embodiment provides a breakaway device for a three-component line and a first modified embodiment provides a breakaway device for a four-component line. A second modified embodiment provides a breakaway device without internal component line connections.

15 Claims, 2 Drawing Sheets

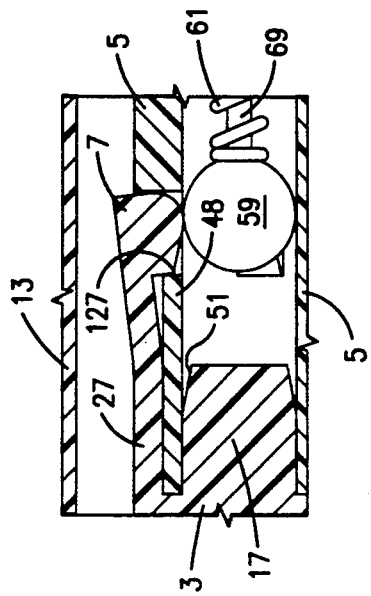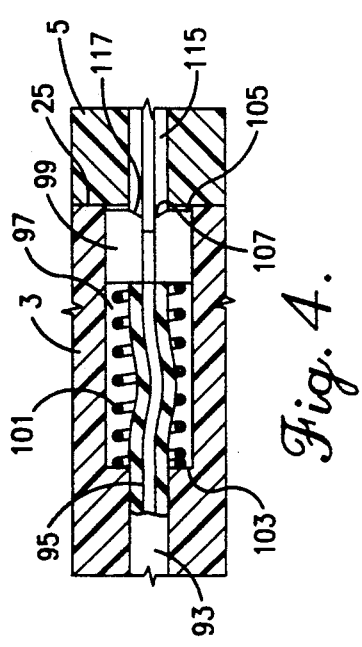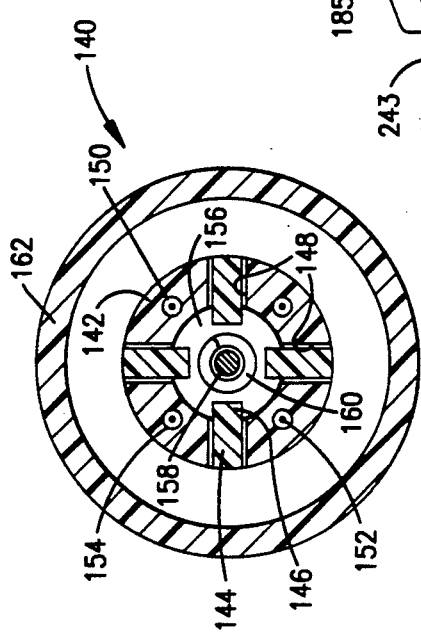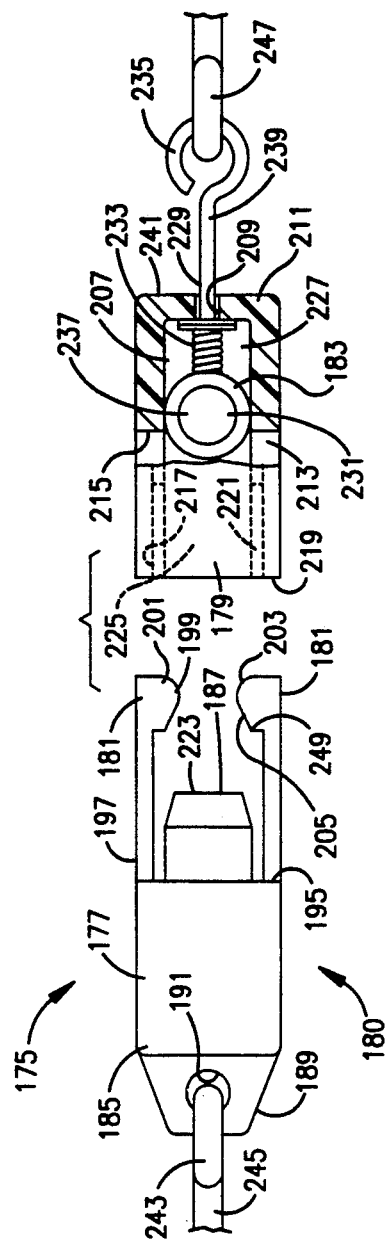

SUSPENDED LINE BREAKAWAY DEVICE

BACKGROUND OF THE INVENTION

The present invention generally relates to a suspended line breakaway device and, more specifically without limitation, to a breakaway device for suspended lines comprising multiple components, such as overhead utility lines and tractor-trailer interconnecting electrical and pneumatic lines.

Electrical energy, either as a source of power or as a source of information, provides an invaluable service to society. Such electrical energy is distributed by various means, such as wirelessly, underground cables, etc. Some of that electrical energy, however, is distributed by overhead, multi-component lines or cables, such as three-wire single-phase cables, four-wire three-phase cables, telephone cables, prescription television cables, and the like. As the overhead cables approach their final distribution point, these cables generally must be disposed reasonably near the ground, such as between a utility pole and a house, or other similar arrangement.

A load bearing suspension cable is generally utilized along with the electrical cable to substantially remove weight and other normal external stresses from the latter. Even so, the suspension cable may fail or break due to excessive ice accumulation, high winds, falling tree branches, moving vehicles, and the like. Failure of the suspension cable increases the likelihood of failure of the electrical cables associated therewith. If such breakage should occur at a point sufficiently removed from a support, the end of the electrical cable which is disposed between the break and such support may either reach the ground or be suspended in close proximity to the ground, creating a potential risk of serious injury. If the failed cable should become "grounded" at the break, electrical service upstream from the break may also be disrupted.

In addition to the various hazards caused by such failure, a violent and destructive wrenching apart of the electrical cable sometimes complicates the repair subsequently needed to restore the electrical cable to its pre-failure operating conditions.

Similarly, a tractor-trailer unit is generally interconnected with a suspended electrical line and one or more suspended pneumatic lines. As the tractor is disengaged from the trailer, failure to also disconnect the electrical and pneumatic lines can lead to destructive failure of the latter as they are physically wrenched apart.

What is needed is a relatively simple and inexpensive device which, when circumstances so require, separates the suspended lines prior to destructive failure thereof and, in the case of suspended electrical lines, such separation occurring in a manner whereby the upstream end of the separated electrical line remains elevated high above the ground while the downstream end of the separated electrical cable is rendered neutral such that it may fall harmlessly to the ground, and whereby the separated ends of the lines can be quickly and easily reconnected, thus restoring the lines to their pre-failure, operating conditions.

SUMMARY OF THE INVENTION

An improved suspended line breakaway device is provided to adapt a suspended cable or line to safely and non-destructively respond to excessive, externally applied forces. The device is applicable to electrical service entry cables, telephone and television cables, tractor-trailer electrical and pneumatic interconnecting lines, and the like.

The device includes a first or upstream body portion having a tab for connecting to a first or upstream end of a support cable, a registration end, and a plurality of fingers, each having an inwardly directed nub at a distal end thereof. The device also includes a second or downstream body portion having a cavity with an endwall and a plurality of slots through a side wall for receiving the nubs. The nubs partially partition the cavity into a first or upstream cavity portion and a second or downstream cavity portion. Each of the nubs has a rounded leading edge to facilitate connecting the first and the second body portions in a latching engagement and a tapered trailing edge to facilitate disengaging the body portions from each other.

A trigger provides a mechanism for releasing the second body portion from the first body portion. The trigger includes a pullrod slidably disposed in a bore through the endwall. The pullrod has a hook end for connecting to a second or downstream end of the support cable and a spreader end for connecting to a spreader which is slidably displaceable axially in the cavity. A trigger spring about the pullrod and disposed between the spreader and the endwall causes the spreader to normally be spaced within the first cavity portion as the first and the second body portions are connected in latching engagement.

Each of a plurality of first or upstream component lines or conductors, which has an end embedded in the first body portion, is connected to a different one of a plurality of blocks or connectors, each of which is slidably displaceable in a different one of a plurality of connector cavities. Each of the blocks, which has a partial bore in an outwardly facing surface, is urged outwardly from the first body portion by one of a plurality of connector springs.

Each of a plurality of second or downstream component lines or conductors, which has an end embedded in the second body portion, is connected to a different one of a plurality of prongs, each protruding from the second body portion such that each of the prongs makes connection with a respective one of the blocks as the nubs are received by the slots.

As the device is subjected to an externally applied force component along the support cable, the trigger spring is compressed, displacing the spreader relative to the second body portion such that the spreader passes between the nubs causing heels on the nubs to be displaced sufficiently outwardly that the bias exerted between the spreader and the endwall forces the second body portion outwardly relative to the first body portion. As the two body portions separate from each other, each of the prongs connected to the second component lines simultaneously and non-destructively separates from the respective blocks connected to the first component lines. For the line connections internal to the device, a shield provides protection therefor from the elements. A similar device connecting hollow first component lines with hollow second component lines can be used as a breakaway device for fluid lines between a tractor unit and a trailer unit.

The first described embodiment provides a suspended line breakaway device for interconnection with a three-component suspended line, such as a three-wire, single-phase electrical cable. The next described embodiment provides a suspended line breakaway device for interconnection with a four-component suspended line, such as a four-wire, three-phase electrical cable.

The second modified embodiment provides a device wherein the separable connections of the suspended line remain external to the device, such as for applications for low voltage telephone or television cables, or the like. For an application using the second modified device, the suspended line is generally looped such that as an external force causes the device to separate, the loop unfolds allowing the separated ends of the suspended line to fall harmlessly downwardly for later reconnection.

PRINCIPAL OBJECTS AND ADVANTAGES OF THE INVENTION

Therefore, the principal objects and advantages of the present invention include: to provide a suspended line breakaway device for connecting to a suspended multi-component line, such as an overhead utility cable; to provide such a device for nondestructively disconnecting a first or upstream end of an overhead electrical utility cable from a second or downstream end of the overhead cable when the cable is subjected to excessive external forces; to provide such a device for disconnecting a first or upstream end of an overhead electrical utility cable from a second or downstream end of the overhead cable in close proximity to the nearest upstream supporting structure such that the first end remains suspended substantially above the ground and the disconnected second end becomes electrically neutral and harmless; to provide such a device whereby interference to the operation of an electrical distribution system upstream from the device is generally unaffected while the device is disconnected; to provide such a device whereby a suspended line can be quickly and easily disconnected and subsequently reconnected, when needed for maintenance or repair activities and the like; to provide such a device for non-destructively disconnecting all of the component lines of a multi-component suspended line automatically and simultaneously; to provide such a device for electrical connections between a tractor unit and a trailer unit; to provide such a device for fluid connections between a tractor unit and a trailer unit; and to generally provide such a device which is efficient and reliable, economical to manufacture, simple to maintain, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a fragmentary cross-sectional view of a connector of the suspended line breakaway device.

FIG. 5 is a fragmentary, cross-sectional view of the suspended line breakaway device, showing a spreader and a locking finger in releasing engagement.

FIG. 6 is a cross-sectional view of a first modified embodiment of a suspended line breakaway device, according to the present invention, similar to that shown in FIG. 2.

FIG. 7 is a cross-sectional view of a second modified embodiment of a suspended line breakaway device with portions cut away to reveal details thereof, according to the present invention.

DETAILED DESCRIPTION OF THE INVENTION

I. Introduction

Figure 1:
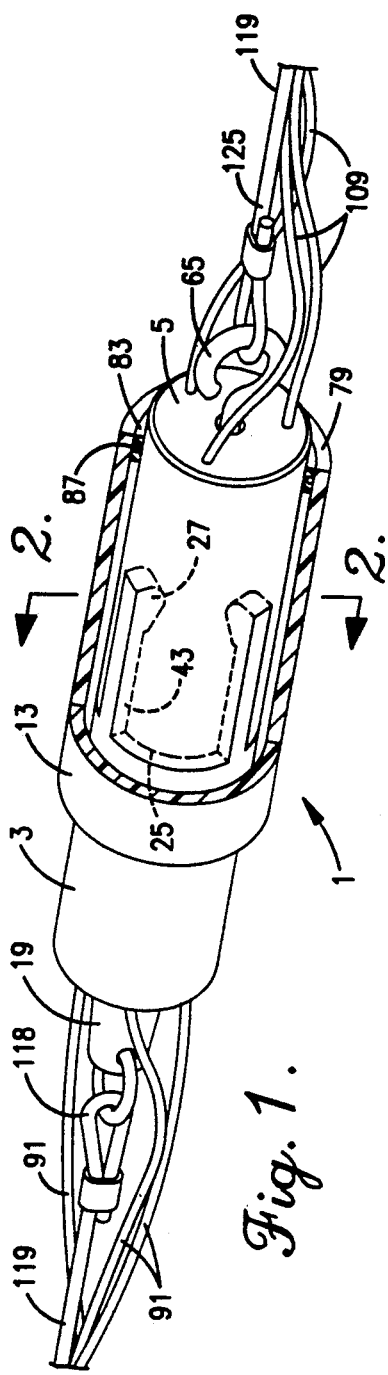
FIG. 1 is a perspective view of a suspended line breakaway device according to the present invention.
Figure 2:
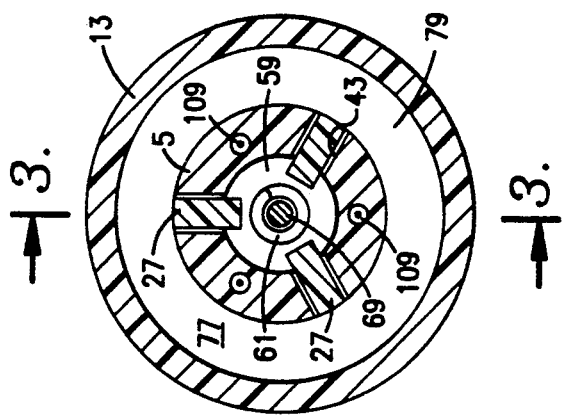
FIG. 2 is an enlarged and cross-sectional view of the suspended line breakaway device, taken generally along line 2—2 of FIG. 1.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally refers to a suspended line breakaway device in accordance with the present invention, as shown in FIGS. 1 through 5. The device 1 includes body means, such as a first or upstream body portion 3 and a second or downstream body portion 5; latching means, such as a plurality of latches 7, triggering means, such as a trigger 9; component line connecting means, such as a plurality of connectors 11; and shielding means, such as a shield 13.

II. Body Means

Figure 3:
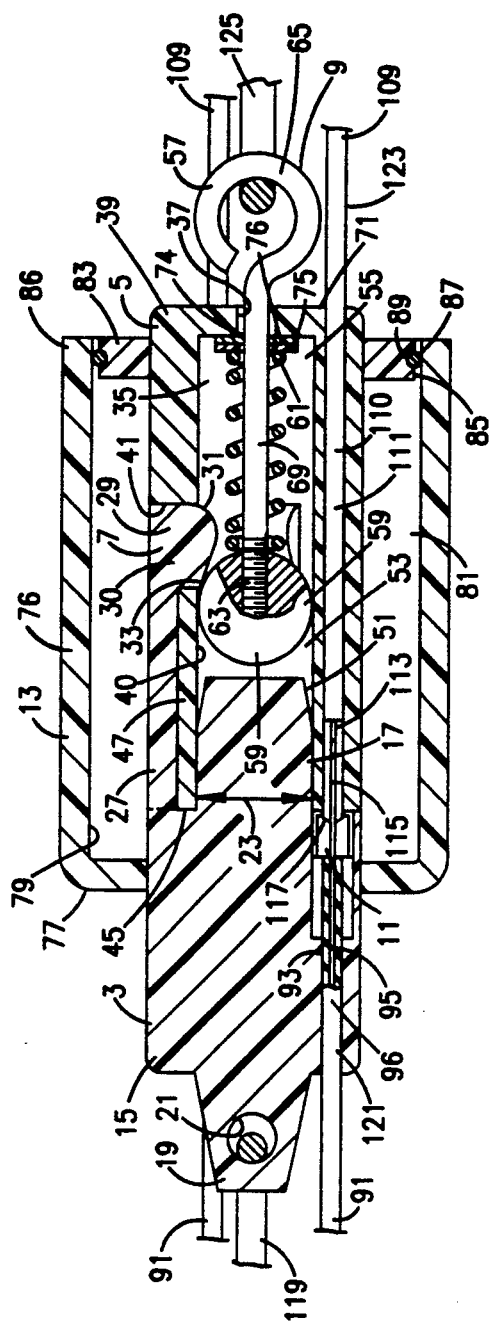
FIG. 3 is an enlarged, partially cross-sectional view of the suspended line breakaway device, taken generally along line 3—3 of FIG. 2.

The first body portion 3 is generally cylindrically shaped, having a butt end 15 and a registration end 17. A tab 19, having a bore 21 therethrough, extends centrally and outwardly from the butt end 15 as shown in FIG. 3. The registration end 17 is generally cylindrically shaped with a diameter, as designated by the numeral 23 in FIG. 3. The generally radial transition of the first body portion 3 from the registration end 17 to the butt end 15 provides a shoulder 25, as shown in FIG. 1. The first body portion 3 and the second body portion 5 are generally constructed of a suitable material, such as 33% glass-filled nylon 66 NYLAMID 5133 as provided by ALM, nylon glass fiber reinforced resin such as GF 30-60 XE-N-HS as provided by Wellman, Inc. under the trademark WELLAMID, or the like, formed by a compression or injection molding process or other suitable means.

III. Latching Means

Each of the latches 7 includes a finger 27 having a transverse nub 29 at a distal end 30 thereof. The fingers 27 generally extend forwardly (toward the right as shown in FIG. 3) and beyond the registration end 17. Each of the nubs 29 has a rounded leading edge 31 and a tapered trailing edge 33 for facilitating connection of the first body portion 3 and the second body portion 5 in a latching engagement as hereinafter described. The fingers 27, which are generally formed integrally with the first body portion 3, are constructed of resilient material. Preferably, the fingers 27 are spaced equidistantly along the shoulder 25.

The second body portion 5 generally has a cylindrical shape with a cavity 35 and a throughbore 37 in an endwall 39 thereof. The second body portion 5 has an outer diameter which is dimensioned substantially similar to the outer diameter of the first body portion 3. A cavity wall 40 has an inner diameter which is dimensioned slightly larger than the diameter 23 of the registration end 17 of the first body portion 3. The second body portion 5 has a plurality of throughslots 41, each for receiving a different one of the nubs 29.

A plurality of grooves 43, each for cooperating with a different one of the nubs 29, extend from a respective one of the slots 41 to a distal end 45 of the second body portion 5. The thickness of a groove wall 47, disposed between each of the grooves 43 and the cavity 35, is dimensioned such that the second body portion 5 can be slidably inserted between the fingers 27 and telescoped over the registration end 17, as shown in FIG. 3. The registration end 17 has a tapered end 51 for guiding the second body portion 5 about the registration end 17 during such slidable insertion. The second body portion 5 is mated with the first body portion 3 such that the distal end 45 is substantially in abutting engagement with the shoulder 25 as the nubs 29 are contained in the slots 41 whereat the nubs 29 partially partition the cavity 35 into a first or upstream cavity portion 53 and a second or downstream cavity portion 55.

IV. Triggering Means

The trigger 9 includes a pullrod 57, a spreader 59, and a compression or trigger spring 61. The pullrod 57 is constructed of steel, or other suitable material, and has a threaded spreader end 63 and a loop or hook end 65. The spreader 59, which is constructed of nylon or other suitable material, has a threaded bore 67 for threadably mating with the pullrod spreader end 63. The spreader 59 is dimensioned slightly smaller than the inner diameter of the cavity wall 40 such that the spreader 59 can be easily slidably displaced longitudinally along the cavity 35.

The pullrod 57 has a generally linear shaft 69 extending from the hook end 65 to the spreader end 63. The shaft 69 is dimensioned such that as the hook end 65 is in close proximity to an outer surface 71 of the endwall 39 and the spreader end 63 is threadedly connected to the spreader 59, the spreader 59 is spaced within the first cavity portion 53 between the nubs 29 and the registration end 17 of the first body portion 3.

The trigger spring 61, which is generally spaced within the second cavity portion 55 and about the shaft 69, is dimensioned such that the trigger spring 61 simultaneously bears against both the endwall 39 and the spreader 59, thereby urging the spreader 59 away from the endwall 39 and normally operably causing the spreader 59 to be spaced within the first cavity portion 53, as shown in FIG. 3. A weatherseal 74, such as a rigid washer 75 in conjunction with a flexible washer 76, which is sandwiched between the rigid washer 75 and the endwall 39, is spaced about the shaft 69 and between the trigger spring 61 and the endwall 39. Preferably, the trigger spring 61 has a spring constant having sufficient magnitude normally to apply a biasing force against the spreader 59 in the range of approximately 160–400 lbs.

V. Shielding Means

The shield 13 is generally cylindrically shaped with a shield sidewall 76 and a shield endwall 77, which is sealingly secured about the first body portion 3, such that a cavity 79 is formed therein. A closure wall 83 is sealingly secured about the second body portion 5. The shield 13 is dimensioned such that as the nubs 29 are slidably displaced along the grooves 43, the finger 27 are generally disposed within the cavity 79 between the groove walls 47 and the shield sidewall 76.

The shield 13 and the closure wall 83 are also dimensioned such that as the distal end 45 of the downstream body portion 5 is in abutting engagement with the shoulder 25, a peripheral edge 85 of the closure wall 83 is spaced in close proximity to a distal end 86 of the shield sidewall 76. An O-ring 87 in an O-ring groove 89 provides a removable, weather-sealing arrangement between the closure wall 83 and the shield sidewall 76. A lubricant applied to the O-ring 87, such as Dow 714 silicone grease, or other suitable material, may be used to increase the effectiveness of such sealing arrangement.

VI. Component Line Connecting Means

Three first or upstream component lines 91, each generally, in the case of electrical component lines, having an insulating outer layer 93 and a conductive core 95, have first imbedded ends 96 which are fixedly imbedded in the first body portion 3. Preferably, the first imbedded ends 96 are parallelly and equidistantly spaced relative to each other such that their axes are spaced substantially centrally between the fingers 27. Depending on a particular use of the present invention for electrical applications, the cores 95 may range from approximately 14-gauge for 15-ampere applications to approximately 00-gauge for 200-ampere applications.

In the case of an application of the present invention to a suspended electrical line, each of the cores 95 extends into a different connector cavity 97 whereat a respective core 95 is electrically connected to a terminal or connector block 99. Each of the connector blocks 99 is dimensioned such that it is easily slidable longitudinally within the respective connector cavity 97. Each of the connector cavities 97 contains a compression or connector spring 101, which is sandwiched between a connector cavity endwall 103 and the connector block 99 such that each of the connector springs 101 applies a biasing force of approximately 15 lbs. against the respective connector block 99. Each of the first imbedded ends 96 has sufficient "slack" that an outwardly facing wall 105 of the block 99 is displaceable axially relative to the respective connector cavity 97 approximately ⅛-inch such that the connector block 99 is generally urged outwardly by the respective connector spring 101 to a position in close proximity to, or slightly protruding from, the shoulder 25. The connector blocks 99 are generally constructed of copper, brass, or other suitable material and each has a partial bore 107 in the wall 105. Preferably, the partial bores 107 are somewhat conically shaped, as shown in cross-section in FIG. 4, to provide ample surface for contact as hereinafter described.

Three second or downstream component lines 109 have second imbedded ends 110 which are fixedly imbedded in the second body portion 5. Each of the second lines 109, which generally, in the case of electrical component lines, has an insulating outer layer 111 and a conductive core 113, is connected in electrical communication to a different one of a plurality of prongs 115. The prongs 115, which are also fixedly imbedded in the second body portion 5, each generally has a distal end 117 which protrudes beyond the distal end 45 of the second body portion 5. The prongs 115 are dimensioned and spaced such that as the first body portion 3 and the second body portion 5 are disposed in latching engagement, as shown in FIG. 3, each of the connector blocks 99 is biased against the distal end 117 of a respective one of the prongs 115 by the connector springs 101, thereby making electrical contact between cooperating ones of the connector blocks 99 and the prongs 115.

In the case of an application of the present invention to a suspended fluid line, such as pneumatic component lines interconnecting a tractor-trailer unit, the blocks 99 and the prongs 115 are preferably constructed of brass, are hollow such that the hollow first component lines 91 communicate with the hollow second component lines 109 as the first body portion 3 and the second body portion 5 are connected in latching engagement, and are adapted such that each of the blocks 99 forms a generally fluid or air-tight connection with a respective one of the prongs 115.

VII. Operation

In operation, a first or upstream end 118 of a support cable 119 is appropriately securely connected to the tab 19, as illustrated in FIG. 1, such that the first body portion 3 is suspended substantially above the ground and normally beyond the reach of humans and animals standing on the ground. Three component lines of a first or upstream end of a suspended line, such as an electrical utility cable (not shown), consisting of a neutral conductor and two non-neutral conductors, are each electrically spliced to a different one of the first lines 91 of the device 1 by methods commonly known in the art. For discussion purposes, assume that the neutral conductor is connected to the first lines 91 designated by the numeral 121 in FIG. 3.

Similarly, three component lines of a second or downstream end of the (unshown) electrical utility cable, consisting of a neutral conductor and two non-neutral conductors, are each electrically spliced to a respective one of the second lines 109 such that the two non-neutral conductors and the neutral conductor of the second end of the (unshown) electrical utility cable are subsequently electrically connectable by the device 1 to the two non-neutral conductors and the neutral conductor, respectively, of the first end of the (unshown) electrical utility cable. Also, a second or downstream end 125 of the support cable 119 is appropriately securely connected to the hook end 65, as shown in FIG. 1.

The distal end 45 of the second body portion 5 is then inserted between the fingers 27 such that the distal end 45 is in substantially abutting engagement with the shoulder 25 and such that each of the nubs 29 is biased into a respective one of the slots 41. Tension is adjusted in the support cable 119 such that the (unshown) electrical utility cable and the device 1 are properly suspended by methods commonly known in the art. The trigger spring 61 is designed to apply sufficient biasing force to the spreader 59 to normally resist such tension, thereby causing the spreader 59 to normally be spaced within the first cavity portion 53. Also, the engagement of the closure wall 83 with the distal end 86 of the shield sidewall 76, through the O-ring 87, provides a weather-sealing arrangement which protects the electrical contacts between the connector blocks 99 and the prongs 115 and other contacts internal to the device 1 from the elements.

In the event that the (unshown) electrical utility cable should be subjected to an external force which might tend to cause breakage of the suspended line, the trigger spring 61 is designed such that the extra tension developed in the support cable 119 by such external force creates a longitudinal component along the pullrod 57 which overcomes the biasing force of the trigger spring 61 such that the spreader 59 is displaced toward the endwall 39. As the spreader 59 passes between the nubs 29, the fingers 27 are urged outwardly, as shown in FIG. 5, such that a heel 127 of each of the nubs 29 is displaced outwardly beyond the groove wall 48 whereat the force exerted by the trigger spring 61 on the endwall 39 urges the groove walls 48 outwardly past the nubs 29, thereby non-destructively releasing the second body portion 5 from the first body portion 3.

As the body portions 3 and 5 are so releasably disengaged from each other, the prongs 115 also disengage from the respective connector blocks 99 thereby disconnecting the second lines 109 from the first lines 91, with the then neutralized second lines 109 falling harmlessly to the ground, with the second body portion 5 and the second end of the (unshown) electrical utility cable still connected thereto. The non-neutralized first end of the (unshown) electrical utility cable, which remains connected to the first lines 91 and the first body portion 3, dangles harmlessly substantially above the ground. While disconnected, the cavity 79 is directed generally downwardly to protect the exposed connector blocks 99 from adverse elements, such as rainfall.

To repair the separated, suspended line, it is a simple matter to reconnect the second body portion 5 to the first body portion 3 as hereinbefore described. For applications which require that power be temporarily disconnected from the suspended line 119 downstream from the device 1, it is a simple matter to pull downwardly on the suspended line 119, thereby tripping the trigger 9 and arbitrarily disengaging the second body portion 5 from the first body portion 3. After the repair or maintenance work has been completed, communication can be subsequently restored by simply slidably reconnecting the body portions 3 and 5.

VIII. First Modified Embodiment

A first modified suspended line breakaway device in accordance with the present invention in shown in FIG. 6 and is generally designated by the reference numeral 140. Many of the characteristics of the first modified suspended line breakaway device 140 are substantially similar to those previously described for the suspended line breakaway device 1 and are not reiterated here in detail.

The first modified suspended line breakaway device 140, which can be used for interconnection with a four-component suspended line, such as a four-wire, three-phase suspended utility cable (not shown), consisting of a neutral conductor and three non-neutral conductors, includes separable body means, such as a first or upstream body portion (not shown), a second or downstream body portion 142, and a plurality of fingers 144, each having a nub 146 which snaps into a respective slot 148 to maintain the second body portion 142 in near abutting relationship with the (unshown) first body portion.

Each of a plurality of embedded connectors 150, having a conductive core 152 and generally having an insulating outer layer 154 in the case of electrical component lines, is equidistantly spaced between the fingers 144. The embedded connectors 150 releasably connect the three non-neutral conductors and the neutral conductor of a first or upstream end of the (unshown) suspended line respectively to the three non-neutral conductors and the neutral conductor of a second or downstream end of the (unshown) suspended line. Triggering means, including a spreader 156, a pullrod 158, and a compression trigger spring 160, provide a mechanism for nondestructively disengaging the second body portion 142 from the (unshown) first body portion as previously described for another embodiment herein. Similarly, shield means 162 provides protection from the elements for connections internal to the device 140.

It is to be understood that the present invention is not limited to three-wire and four-wire electrical suspended lines as hereinbefore described, but can be used for a variety of cables having one or more conductors. It is also to be understood that the present invention is equally applicable to suspended electrical lines and fluid lines interconnecting a tractor unit (not shown) with a trailer unit (not shown), or other similar arrangement.

IX. Second Modified Embodiment

A second modified suspended line breakaway device in accordance with the present invention is shown in FIG. 7 and is generally designated by the reference numeral 175. Many of the characteristics of the second modified suspended line breakaway device 175 are substantially similar to those previously described for other embodiments herein and are not reiterated here in detail.

The device 175 includes body means, such as a first or upstream body portion 177 and a second or downstream body portion 179; latching means, such as a plurality of latches 181; and triggering means, such as a trigger 183.

The first body portion 177 has a butt end 185 and a registration end 187. A tab 189, having a bore 191 therethrough, extends centrally and outwardly from the butt end 185 as shown in FIG. 7. The registration end 187 is generally shaped similarly to the butt end 185. A generally radial transition of the first body portion 177 from the registration end 187 to the butt end 185 provides a shoulder 195.

Each of the latches 181 includes a finger 197 having a transverse nub 199 at a distal end 201 thereof. The fingers 197 generally extend forwardly (toward the right as shown in FIG. 7) and beyond the registration end 187. Each of the nubs 199 has a rounded leading edge 203 and a tapered trailing edge 205 for facilitating connection of the first body portion 177 and the second body portion 179 in a latching engagement as hereinafter described. The fingers 197, which are generally formed integrally with the first body portion 177, are constructed of resilient material. Preferably, the fingers 197 are spaced equidistantly along the shoulder 195, such as an opposing pair of the fingers 197 as shown in FIG. 7.

The second body portion 179 generally has a shape and size, similar to that of the first body portion 177, with a cavity 207 and a throughbore 209 in an endwall 211 thereof. A cavity wall 213 has inner dimensions which are slightly larger than the dimensions of the registration end 187 of the first body portion 177. The second body portion 179 has a plurality of throughslots 215, each for receiving a different one of the nubs 199.

A plurality of grooves 217, each for cooperating with a different one of the nubs 199, extend from a respective one of the slots 215 to a distal end 219 of the second body portion 179. The thickness of a groove wall 221, disposed between each of the grooves 217 and the inner surface of the cavity wall 213, is such that the second body portion 179 can be slidably inserted between the fingers 197 and telescoped over the registration end 187. The registration end 187 has a tapered end 223 for guiding the second body portion 179 about the registration end 187 during such slidable insertion. The second body portion 179 is mated with the first body portion 177 such that the distal end 219 is substantially in abutting engagement with the shoulder 195 as the nubs 199 are contained in the slots 215 whereat the nubs 199 partially partition the cavity 207 into a first or upstream cavity portion 225 and a second or downstream cavity portion 227.

The trigger 183 includes a pullrod 229, a spreader 231, and a compression trigger spring 233. The pullrod 229 has a loop or hook end 235 and is secured to the spreader 231. The spreader 231 is dimensioned slightly smaller than the inner dimensions of the cavity wall 213 such that the spreader 231 can be easily slidably displaced longitudinally along the cavity 207. If desired, the spreader 231 may be configured with a non-spherical profile, having one or more planar surfaces 237 for appropriately mating with inner surfaces of the cavity wall 213 and thus prevent rotation of the spreader 231 relative to the second body portion 179.

The pullrod 229 has a generally linear shaft 239 extending from the hook end 235 to the spreader end 231. The shaft 239 is dimensioned such that as the hook end 235 is in close proximity to an outer surface 241 of the endwall 211, the spreader 231 is spaced within the first cavity portion 225 between the nubs 199 and the registration end 187 of the first body portion 177.

The trigger spring 233, which is generally spaced within the second cavity portion 179 and about the shaft 239, is dimensioned such that the trigger spring 233 bears against both the endwall 211 and the spreader 231, thereby urging the spreader 231 away from the endwall 211 and normally spacing the spreader 231 within the first cavity portion 225, as shown in FIG. 7.

In operation, a first or upstream end 243 of a support cable 245 is appropriately securely connected to the tab 189, as illustrated in FIG. 7, such that the first body portion 177 is suspended substantially above the ground and normally beyond the reach of humans and animals standing on the ground. Similarly, a second or downstream end 247 of the support cable 245 is appropriately securely connected to the hook end 235.

The distal end 219 of the second body portion 179 is inserted between the fingers 197 such that the distal end 219 is in substantially abutting engagement with the shoulder 195 as each of the fingers 197 is nested in a respective one of the grooves 217 and each of the nubs 199 is biased into a respective one of the slots 215. Tension is adjusted in the support cable 245 such that the device 175 is properly suspended by methods commonly known in the art. A suspended line having component lines, such as a utility cable having one or more conductors (not shown), may either have its component lines appropriately connected externally to the device 175 such that they can non-destructively separate as the device 175 separates as hereinafter described or, more preferably, the (unshown) suspended line can be looped such that sufficient slack is provided to drop the line downwardly until the device 175 is subsequently reconnected.

The trigger spring 233 is designed to apply sufficient biasing force to the spreader 231 to normally resist the tension in the support cable 245, thereby causing the spreader 231 to be normally spaced within the first cavity portion 225.

In the event that the support cable 245 and the (unshown) suspended line should be subjected to an external force which might tend to cause breakage of the support cable 245, the trigger spring 233 is designed such that the extra tension developed in the support cable 233 by such external force creates a longitudinal component along the pullrod 229 which overcomes the biasing force of the spring 233, displacing the spreader 231 toward the endwall 211. As the spreader 231 passes between the nubs 199, the fingers 197 are urged outwardly, such that a heel 249 of each of the nubs 199 is displaced outwardly beyond the groove wall 221 whereat the force exerted by the trigger spring 233 against the endwall 211 urges the groove walls 221 outwardly past the nubs 199, thereby non-destructively releasing the second body portion 179 from the first body portion 177. To repair the (unshown) suspended line, it is a simple matter to reconnect the second body portion 179 to the first body portion 177 as hereinbefore described.

It is to be understood that while certain forms of the present invention have been illustrated and described herein, it is not to be limited to the specific forms or arrangement of parts described and shown.

What is claimed and desired to be secured by Letters Patent is as follows:

1. A breakaway device for use with a suspended line supported by a support cable having a first cable end and a second cable end, comprising:
   (a) a first body portion having first connecting means for connecting to the first cable end;
   (b) a second body portion having second connecting means for connecting to the second cable end;
   (c) latching means for engaging said first body portion to said second body portion in a latching engagement;
   (d) disengaging means for disengaging said latching means;
   (e) a plurality of first component lines, each having a first end embedded in said first body portion;
   (f) a plurality of second component lines, each having a second end embedded in said second body portion; each of said first component lines adapted to establish disengageable connection with a respective one of said second component lines as said first body portion and said second body portion are in said latching engagement;
   (g) a plurality of connector cavities, one for each of said first component lines;
   (h) a plurality of connector blocks, one disposed in each of said connector cavities; each said connector block slidable axially along respective said conductor cavity; each said connector block connected to a respective one of said component lines embedded in said first body portion; and
   (i) a plurality of connector springs, one disposed in each of said connector cavities such that respective said connector block is biased toward said second body portion as said first body portion and said second body portion are in said latching engagement.

2. The breakaway device according to claim 1 wherein said latching means comprises:
   (a) a plurality of fingers, each having a proximal end and a distal end; said proximal ends connected to said first body portion such that said fingers extend generally parallel outwardly from said first body portion; each of said distal ends having a nub extending generally transversely inwardly therefrom; and
   (b) a plurality of slots formed in said second body portion; each of said slots spaced to cooperatively receive a respective one of said nubs as said first body portion and said second body portion are in said latching engagement.

3. The breakaway device according to claim 2, wherein:
   (a) said second body portion includes an endwall with a bore therethrough and a cavity; said cavity formed within said second body portion such that as said nubs are received in said slots, said nubs protrude into said cavity, partitioning said cavity into a first cavity portion and a second cavity portion;
   (b) said disengaging means includes:
   (1) a pullrod having a spreader end; said pullrod slidably contained in said endwall bore;
   (2) a spreader connected to said pullrod spreader end; said spreader slidably displaceable axially along said cavity; and
   (3) a trigger spring spaced about said pullrod such that said trigger spring biases said spreader away from said endwall; and
   (c) said second connecting means includes a hook end secured to said pullrod; said hook end extending outwardly from said second body portion.

4. The breakaway device according to claim 3, wherein:
   said first body portion has a registration end such that said second body portion is slidably telescoped over said registration end as said first body portion and said second body portion are in said latching engagement.

5. The breakaway device according to claim 1 including:
   shield means for shielding said disengageable connections.

6. The breakaway device according to claim 2, including:
   (a) each of said nubs having a rounded leading edge and a tapered trailing edge; and
   (b) a plurality of grooves, each receiving a respective one of said fingers as said first body portion and said second body portion are in said latching engagement.

7. The breakaway device according to claim 1, wherein:
   said first connecting means include a tab with a throughbore extending outwardly from said first body portion.

8. The breakaway device according to claim 1 including:
   (a) a plurality of prongs, one connected to each of said second component lines embedded in said second body portion; said prongs protruding from said second body portion such that each of said prongs establishes connection with a different one of said connector blocks as said first body portion and said second body portion are in said latching engagement.

9. The breakaway device according to claim 8 wherein:

each said connector block has a partial bore in an outwardly facing side thereof for receiving a respective one of said prongs.

10. The breakaway device according to claim 1 wherein:
   (a) the number of said first component lines and said second component lines is three.

11. The breakaway device according to claim 1 wherein:
   (a) the number of said first component lines and said second component lines is four.

12. The breakaway device according to claim 1 wherein:
   said disengageable connection provides electrical communication between each of said first component lines and a respective one of said second component lines.

13. The breakaway device according to claim 1 wherein:
   said disengageable connection provides generally fluid-tight communication between each of said first component lines and a respective one of said second component lines.

14. A breakaway device for use with a suspended line supported by a support cable having a first cable end and a second cable end, comprising:
   (a) a first body portion having first connecting means for connecting to the first cable end;
   (b) a second body portion having second connecting means for connecting to the second cable end;
   (c) a plurality of circumferentially spaced slots in said second body portion, each slot terminating at an edge formed on said second body portion;
   (d) a plurality of flexible fingers projecting from said first body portion, each finger terminating in a tip;
   (e) a nub projecting inwardly on the tip of each finger, said nubs fitting through the respective slots and hooking onto the corresponding edges of the slots when the first and second body portions are assembled, the engagement between the nubs and edges acting to latch the first and second body portions together; and
   (f) a spreader carried on said second body portion and acting against said nubs in a manner to force the nubs outwardly through the slots to disengage the nubs from the edges of the slots when said first and second cable ends are pulled apart with a force applied at a predetermined level, whereby disengagement of the nubs from the edges of the slot releases said first and second body portions from one another.

15. The breakaway device according to claim 14, including:
   a plurality of grooves on said second body portion adjacent to the respective slots at locations to receive said fingers in the grooves when said first and second body portions are latched together.

* * * * *